United States Patent [19]

Elazar et al.

[11] Patent Number: 5,555,383
[45] Date of Patent: Sep. 10, 1996

[54] PERIPHERAL COMPONENT INTERCONNECT BUS SYSTEM HAVING LATENCY AND SHADOW TIMERS

[75] Inventors: Uri Elazar, Alon Hagalil; Yehuda Peled, Bet Shearim, both of Israel

[73] Assignee: International Business Machines Corporation, Armonk, N.Y.

[21] Appl. No.: 337,008

[22] Filed: Nov. 7, 1994

[51] Int. Cl.[6] .............................. G06F 13/14; G06F 13/42
[52] U.S. Cl. .......................... 395/306; 395/309; 395/845; 395/550
[58] Field of Search .................................. 395/306, 308, 395/309, 310, 293, 845, 848, 850, 550

[56] References Cited

U.S. PATENT DOCUMENTS

| | | | |
|---|---|---|---|
| 4,988,989 | 1/1991 | Goto | 340/825.21 |
| 5,239,631 | 8/1993 | Boury et al. | 395/325 |
| 5,392,407 | 2/1995 | Heil et al. | 395/293 |
| 5,396,602 | 3/1995 | Amini et al. | 395/293 |
| 5,426,739 | 6/1995 | Lin et al. | 395/309 |
| 5,446,869 | 8/1995 | Padgett et al. | 395/500 |
| 5,450,551 | 9/1995 | Amini et al. | 395/299 |

Primary Examiner—Jack B. Harvey
Assistant Examiner—Glenn A. Auve
Attorney, Agent, or Firm—Sughrue, Mion, Zinn, Macpeak & Seas

[57] ABSTRACT

A PCI system is provided with a shadow register and a shadow timer. When a master device sends an address designating a target device that is connected to another bus, the device's latency value is recorded in the shadow register. While the PCI-PCI bridge arbitrates for the target bus, the master's latency timer increments but the shadow timer will not begin to increment until the PCI-PCI bridge receives a grant# from the target's bus and data transmission begins. Accordingly, the bus arbiter will not de-assert the grant# until the shadow timer has reached the latency value or the master device has released the bus after completing its data transmission. This ensures that the master device will be allocated a time period equal to its latency value to transmit data.

19 Claims, 4 Drawing Sheets

PERIPHERAL COMPONENT INTERCONNECT BUS SYSTEM HAVING LATENCY AND SHADOW TIMERS

BACKGROUND OF THE INVENTION

1. Field of the Invention

The present invention relates to a computer system having a Peripheral Component Interconnect (PCI) bus system and, more particularly, to such a PCI bus system having latency and shadow timers.

2. Description of the Related Art

It is known in the art to provide a system bus, through which communication can be had between various computer components, including peripheral devices. It is also known that, at any given bus cycle, only one device, termed the master device, can communicate through the system bus. Therefore, in order to control access to the system bus, a device wishing to transmit data must first arbitrate for the bus and receive grant. In conventional systems, the master device will not release the bus until data transmission is completed.

However, the master device may also be forced to release control of the system bus. Such a situation occurs when another device requests bus mastership. If the bus arbiter decides to shift the grant to the requesting device, it may de-assert the grant from the master device and grant mastership to the requesting device. In this situation, the master device has only one cycle left before it must release the bus.

One system which has been developed to enable efficient use of the system bus is the Peripheral Component Interconnect (PCI) architecture. In PCI systems, each device is provided with a latency timer and a predetermined latency value. An exemplary PCI system is shown in FIG. 1. A more detailed explanation of a known PCI system can be found in, for example, PCI Local Bus Specification, Revision 2.0, Copyright 1992, 1993, PCI Special Interest Group, and in PCI to PCI Bridge Architecture Specification, Revision 1.0, 1994 (original issue), PCI Special Interest Group, which are incorporated herein by reference.

With reference to FIG. 1, CPU 10 is connected to cache 20 and host bridge 30. The host bridge 30 is connected to the system memory 40 and the system bus 50. Access to system bus 50 is controlled by bus arbiter 60, which may comprise an integral part of the system bus 50. System bus 50 is used to allow communication between various peripheral devices, and between the peripheral devices and the host bridge. For purpose of illustration, four peripheral devices 100, 200, 300, and 400, are shown in FIG. 1; however, those skilled in the art will understand that the number of devices can vary depending on the particular system arrangement.

Each of the peripheral devices 100, 200, 300, and 400, is connected to the system bus 50 via respective input/output masters 110, 210, 310, and 410, (I/O-DMA master) having respective latency timers 120, 220, 320, and 420, and respective latency values $L_1$, $L_2$, $L_3$, and $L_4$. Each latency value $L_i$ is generally defined in terms of a certain number of bus cycles. In addition, a pair of REQ# and GRT# lines (not shown) are connected between every respective I/O-DMA master 110, 210, 310, and 410, and the arbiter 60.

For the purpose of illustrating the operation of a PCI system, description will be made of the process wherein peripheral device 100 transfers data to peripheral device 200. A similar process occurs when other peripheral devices attempt to transfer data. In order to transfer data to peripheral device 200, peripheral device 100 must arbitrate for the system bus 50. Therefore, I/O-DMA master 110 sends a request to bus arbiter 60. (The terminology used herein is sometimes generalized. For example, in PCI terminology this step would be the equivalent of device 100 asserting REQ#. Also, in PCI terminology the "#" symbol stands for "asserted low" and it will be used hereinafter to designate the respective PCI signal). If bus arbiter 60 determines that peripheral device 100 may access system bus 50 it sends a grant (GNT# or grant#) to I/O-DMA master 110. At such time, peripheral device 100 may assert frame# by sending the proper command (Read, Write, etc.) and the target's address on the respective bus lines (not shown), and begin data transmission. (Frame# is a PCI command generally indicating that a master device is communicating over the bus). At the same time, latency timer 120 begins to increment.

During the time that peripheral device 100 transmits data, another device, such as, for example, peripheral device 300, may arbitrate for control of system bus 50. Bus arbiter 60 may then decide to de-assert the grant# from the master device 100 and grant mastership to the requesting peripheral device 300. If peripheral device 100 completes the data transmission before latency timer 120 reaches the latency value $L_1$, then I/O-DMA master 110 will release the system bus 50 and peripheral device 300 will become the master device.

However, if peripheral device 100 did not complete its data transmission, then it may continue transmission until latency timer 120 reaches the latency value $L_1$. At this point, I/O-DMA master 110 must check whether bus arbiter 60 has de-asserted the grant#. If so, then the master device 100 is allocated one additional cycle to transmit data and, thereafter, I/O-DMA master 110 must release control of system bus 50.

Conversely, if latency timer 120 has reached the latency value $L_1$, but the arbiter 60 has not de-asserted the grant, the master device 100 may continue data transmission. However, from this cycle forward, the I/O-DMA master 110 must check every cycle whether grant# has been de-asserted, and must release the bus 50 immediately upon determining that the grant# has been de-asserted.

It should be noted that, in the system of FIG. 1, only one of the peripheral devices 100, 200, 300, or 400, can assert frame to act as a master device. That is, at any given time, communication through system bus 50 may be had between only two devices. Therefore, PCI architecture has been implemented in systems having multiple busses, so as to allow several peripheral devices to communicate simultaneously.

An exemplary PCI multiple bridge system is shown in FIG. 2, wherein elements similar to those shown in FIG. 1 have the same reference numerals. For the purpose of this example, only four peripheral devices 100, 200, 300, and 400, and two busses 80, and 90, are shown.

In FIG. 2, host bridge 30 is connected to primary bus 80 and secondary bus 90 through the PCI-PCI bridge 70. For the purpose of this example, peripheral devices 100 and 200 are shown to be connected to primary bus 80 and peripheral devices 300 and 400 are shown to be connected to secondary bus 90. It will be appreciated by those skilled in the art, however, that other arrangements are possible.

Mastership of primary bus 80 and secondary bus 90 is controlled by bus arbiters 82 and 92 respectively. The bus arbiters 82 and 92 are illustrated as two respective parts of PCI-PCI bridge 70; however, they can alternatively be implemented, for example, as a single element, or multiple elements constituting respective integral parts of the primary bus 80 and secondary bus 90, as will be apparent to those skilled in the art.

In the PCI system of FIG. 2, communication between peripheral devices 100 and 200 is performed through the primary bus 80, and communication between the peripheral devices 300 and 400 is performed through secondary bus 90, in a manner similar to that described above with respect to FIG. 1. However, a different procedure is followed when either of peripheral devices 100 and 200, connected to primary bus 80, communicates with either of the peripheral devices 300 or 400, connected to the secondary bus 90. Such a procedure is generally referred to as a two level arbitration. For purpose of demonstration, description will be made with respect to the case where peripheral device 100 wishes to transmit data to peripheral device 300.

In order for peripheral device 100 to transmit data to peripheral device 300, it first must arbitrate for primary bus 80. Accordingly, the I/O-DMA master 110 sends a request (asserts REQ#) to the bus arbiter 82. When the bus arbiter 82 sends the grant#, peripheral device 100 asserts frame# by sending the proper command and the target's address on the respective bus lines (not shown). PCI-PCI bridge 70 recognizes that the target for the address is connected to secondary bus 90 and, accordingly, keeps the master device 100 in a wait state and arbitrates for the secondary bus 90.

Meanwhile, when device 100 receives the grant# from bus 80, latency timer 120 begins to increment. It should be appreciated that, although device 100 has asserted frame#, no data is being transmitted at this time since mastership of secondary bus 90, to which peripheral device 300 is connected, has not been established. However, since latency timer 120 begins to increment from the moment I/O-DMA master 110 asserts frame# of primary bus 80, it is possible that it may reach the latency value $L_1$ prior to PCI-PCI bus 70 receiving grant# from secondary bus 90.

If the latency value $L_1$ is reached prior to PCI-PCI bus 70 receiving grant# from secondary bus 90, then the I/O-DMA master 110 would have only one cycle to transfer data before it would be required to release the primary bus 80. As a result, peripheral device 100 would be able to transfer data during only one cycle instead of the number of cycles defined by its latency value $L_1$. Accordingly, if this situation occurs, only a small part of the data from device 100 would be transferred to the target device 300, i.e. only data corresponding to one cycle. In addition, primary bus 80 and PCI-PCI bridge 70 would be wastefully controlled by peripheral device 100 during the time PCI-PCI bridge 70 arbitrates for secondary bus 90. Since data was transmitted only during one cycle, the wasted period is commensurate with the latency value $L_1$.

Alternatively, PCI-PCI bridge 70 may receive a grant# from secondary bus 90 before latency timer 120 reaches the latency value $L_1$ but the remaining time may be insufficient to complete transmission of all the data. Therefore, peripheral devices 100 would transfer data over a period shorter than the number of cycle defined by its latency value $L_1$. Accordingly, part of the latency value $L_1$ period would be wastefully allocated to establishing the connection to the target device rather than to data transfer.

Therefore, in order to increase the number of completed transactions, the latency value $L_i$ (i designating any of peripheral devices 100, 200, 300, or 400) may be set at a maximum permissible value. For example, in existing systems it may be set at a maximum of 256 data cycles (the limiting factor being the number of bits in the register). However, should the latency value $L_1$ be set at such a maximum, it will provide a master device with an unproportionally large share of the total allocable time when the master device is communicating with a device connected to the same bus. As is known to those skilled in the art, certain devices are time sensitive in that they cannot be put in a wait state for too long of a period. Therefore, if a master device asserts frame# during a maximum permissible latency period, such time sensitive devices may not be able to get on the bus and will starve. Such a situation may lead to corruption of data in the starved devices.

Moreover, when a master device that has been allocated the maximum permissible latency is initiating a transaction over the PCI-PCI bridge, part of the latency value is expended on arbitrating for the target's bus. If during the arbitration for the target's bus the latency timer expires, then only one cycle of the maximum permissible latency period would be dedicated to data transmission. Accordingly, in a system where devices are allocated the maximum permissible latency period, each incomplete transaction over the PCI-PCI bridge 70, e.g., when only one data cycle has been used for data transfer, will result in longer wasteful periods.

SUMMARY OF THE INVENTION

Accordingly, it is an object of the present invention to provide for a computer system having better management of bus mastership. In addition, the present invention provides for a PCI system wherein a master device connected to one system bus, may transmit data to a target device connected to another system bus for a period equal to the device's latency value.

According to the present invention, a PCI system is provided with a shadow register and a shadow timer. When a master device sends an address designating a target device that is connected to another bus, the device's latency value is recorded in the shadow register. The PCI-PCI bridge would then arbitrate for the target bus. During this arbitration period, the latency timer of the master device is incrementing, but the shadow timer will not begin to increment until the PCI-PCI bridge received a grant# and data transmission began. Accordingly, in the system of the present invention, the bus arbiter will not de-assert the grant# until the shadow timer has reached the latency value or the master device released the bus after completing its data transmission. This ensures that the device will be allocated a time period equal to its latency value to transmit data. That is, even if the device's latency timer reaches the latency value, it will not be required to release the bus since the bus arbiter will not de-assert the grant# before the shadow timer reaches the latency value.

BRIEF DESCRIPTION OF THE DRAWINGS

Other objects and advantages of the present invention will become apparent from the following description of the preferred embodiments with reference to the drawings, in which.

DETAILED DESCRIPTION OF THE PREFERRED EMBODIMENTS

Figure 2:
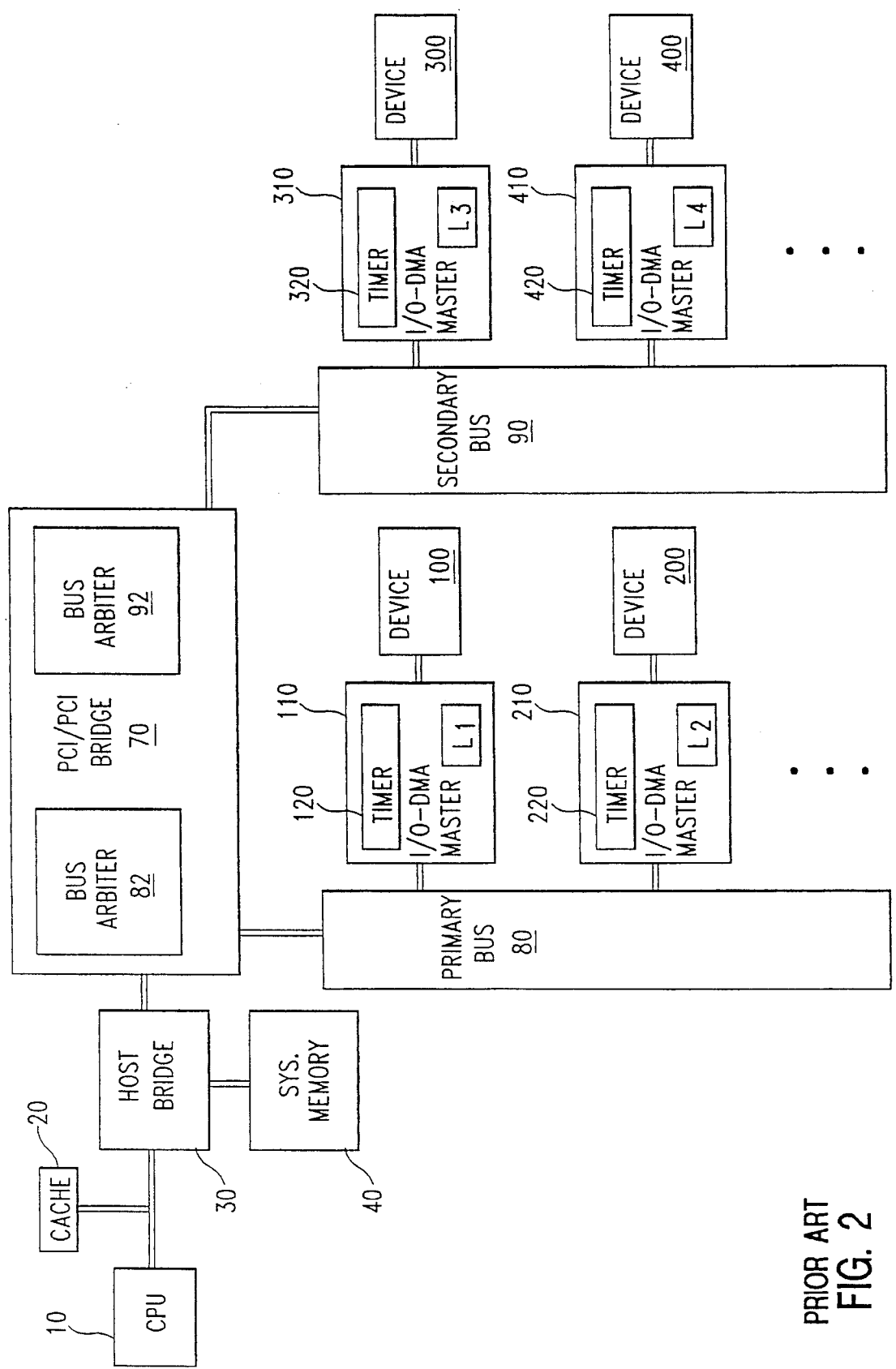
FIG. 2 is a circuit block diagram of a prior art multiple bus PCI system.
Figure 3:
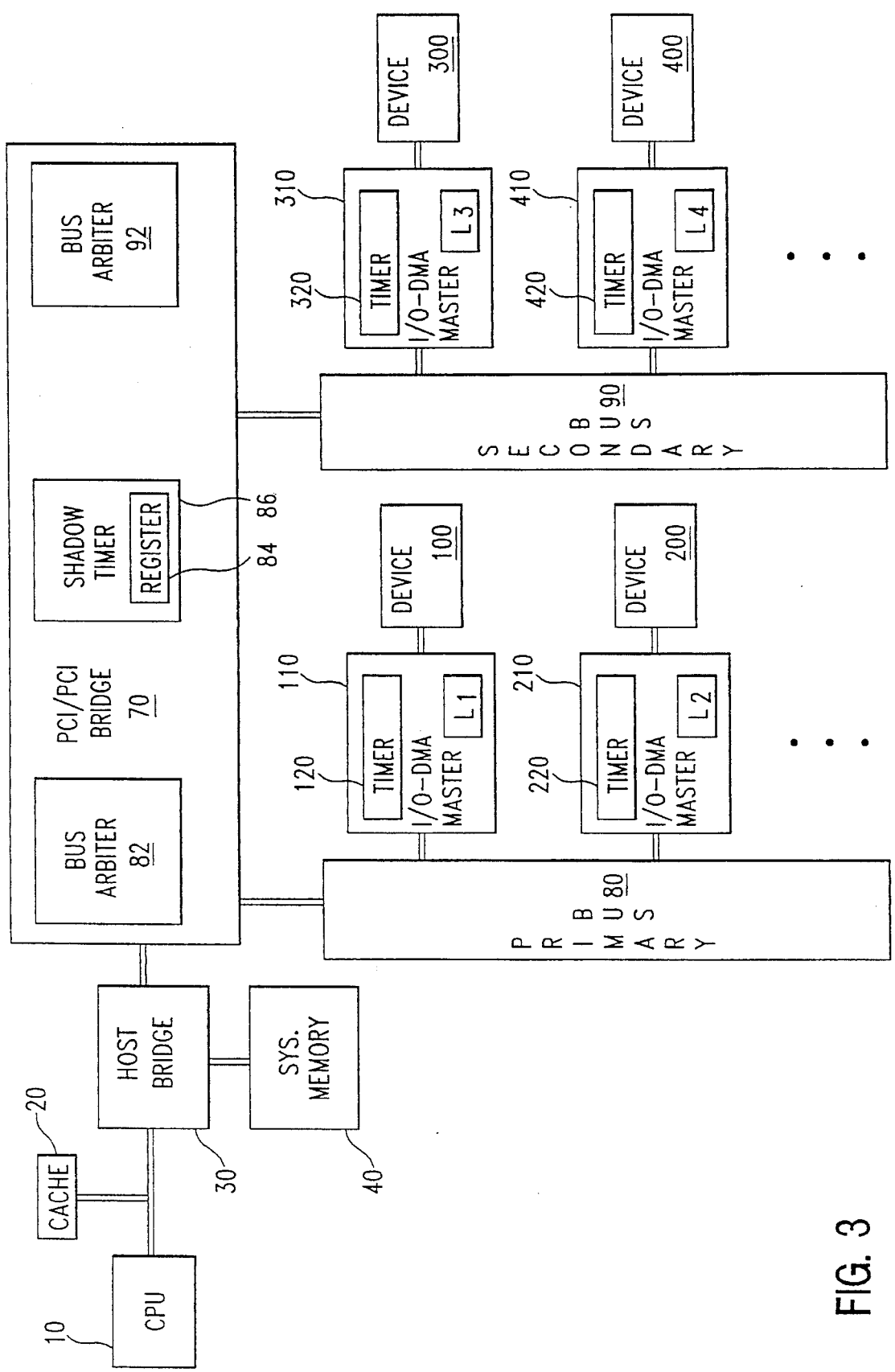
FIG. 3 is a circuit block diagram of a multiple bus PCI system according to an embodiment of the present invention.

A PCI architecture according to an embodiment of the present invention is shown in FIG. 3, in which elements similar to those of FIG. 2 are designated by similar reference numerals. In FIG. 3, PCI-PCI bridge 70 is provided with bus arbiters 82 and 92, shadow register 84, and shadow timer 86. However, it should be appreciated that other arrangements are possible. For example, the number of bus arbiters may vary. In addition, for simplicity only one shadow timer is shown, however, it is preferable to set the number of shadow timers with respective shadow registers to correspond to the number of peripheral devices.

Figure 1:
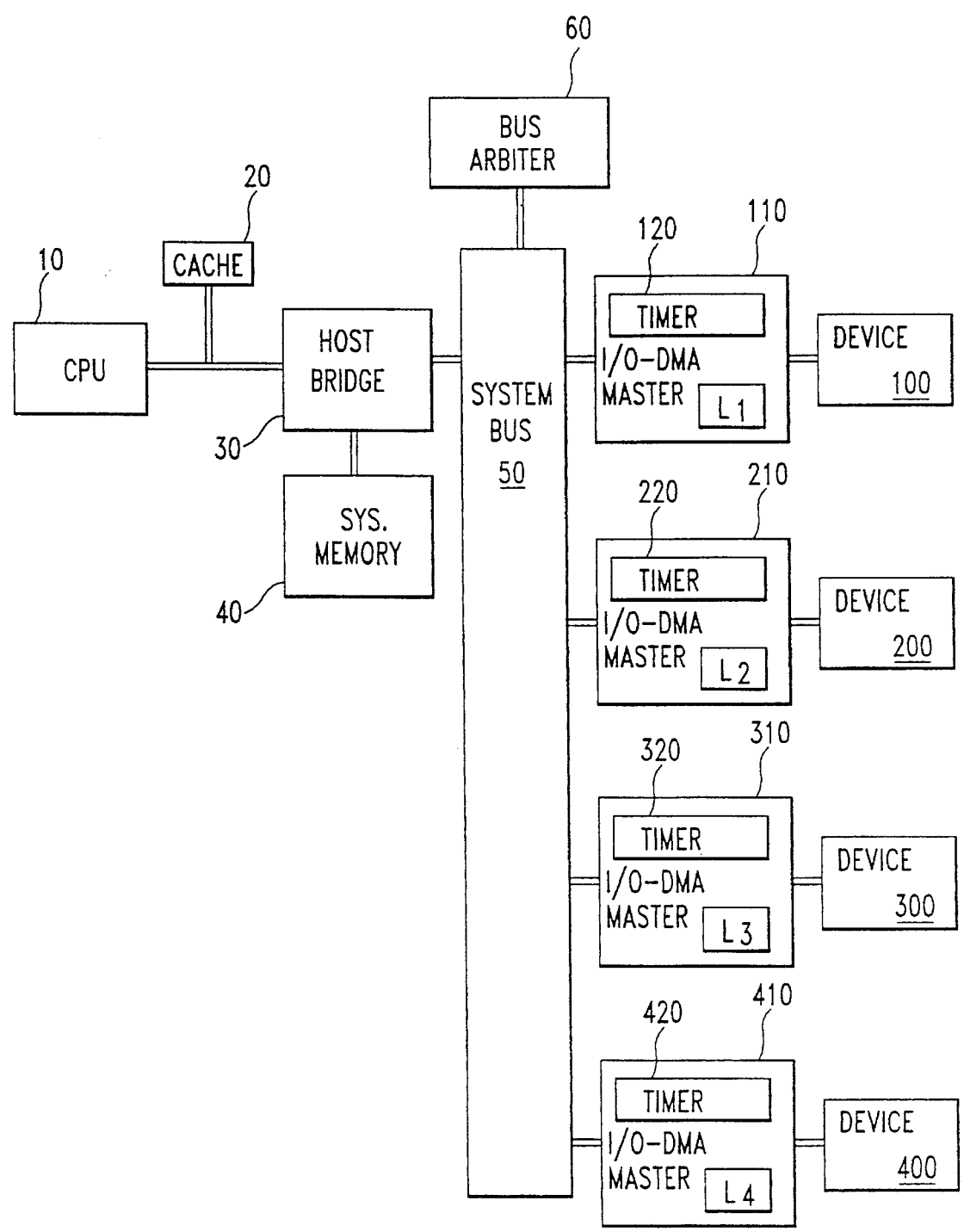
FIG. 1 is a circuit block diagram of a prior art PCI system.

In the embodiment of FIG. 3, the latency value $L_i$ of each of peripheral devices 100, 200, 300, and 400, is set to allow for efficient communication with a respective peripheral device connected to the same system bus. Therefore, for example, the latency value $L_1$ of peripheral device 100 is set to allow peripheral device 100 to efficiently communicate with any peripheral device connected to primary bus 80. Similarly, the latency timer value $L_3$ of peripheral device 300 is set to allow efficient communication with any peripheral device connected to secondary bus 90. Accordingly, communication through a single system bus is accomplished in the same manner as described above with reference to the prior art systems shown in FIGS. 1 and 2.

A particular advantage over the system shown in FIG. 2 is exemplified in the cases where communication is transacted between peripheral devices connected to different system busses. I.e., a two level arbitration. For the purpose of example, the case will be described where peripheral device 100 wishes to transmit data to peripheral device 300. As in the system of FIG. 2, peripheral device 100 first arbitrates for primary bus 80. When bus arbiter 82 sends the grant#, peripheral device 100 asserts frame#, sending the proper command and address on the respective bus lines (not shown), and latency timer 120 begins to increment. PCI-PCI bridge 70 recognizes that the target for the address is connected to secondary bus 90 and, accordingly, records the latency value $L_1$ of peripheral device 100 in shadow register 84, keeps the master device 100 on a wait state, and arbitrates for the secondary bus 90.

In the device of FIG. 3, bus arbiter 82 may de-assert the grant# only if peripheral device 100 has completed data transmission and released the primary bus 80, or after the shadow timer 86 has reached the latency value $L_1$. The shadow timer 86, however, does not begin to increment until the PCI-PCI bridge 70 receives grant# from bus arbiter 92 and device 100 begins data transmission. Therefore, during the period when PCI-PCI bridge 70 arbitrates for secondary bus 90, the bus arbiter 82 will not de-assert the grant# (i.e., device 100 will not release the primary bus 80 because it has not begun, let alone completed, data transfer, and bus arbiter 82 will not de-assert the grant# because shadow timer has not begun counting, let alone reached the latency value $L_1$).

When the PCI-PCI bridge 70 receives the grant# from bus arbiter 92, device 100 may begin transmitting the data. Consequently, from this point on, every cycle counted by shadow timer 86 would be a data transfer cycle rather than an idle cycle. Moreover, since shadow timer 86 expires only after it reaches the latency value $L_1$, which is stored in register 84, peripheral device 100 can efficiently use its latency value $L_1$ period for data transfer purposes.

If peripheral device 100 completes its data transmission before shadow timer 86 has reached the latency value $L_1$, it will release the primary bus 80. At such time, arbiter 82 may de-assert the grant#. Alternatively, if data transmission is not completed but the shadow timer 86 has reached the latency value $L_1$, bus arbiter 82 may de-assert the grant#. It is noted that from the moment the latency timer 120 has reached the latency value $L_1$, the I/O-DMA master 110 checks whether grant# has been de-asserted at every cycle. Therefore, if the shadow timer 86 has reached the latency value $L_1$ and the bus arbiter 82 has de-asserted the grant#, I/O-DMA master 110 will have to release the primary bus 80.

From the above description, it should become apparent that the latency timer 120 will always expire before the shadow timer 86. (While both timers count the same period length, the latency timer 120 begins to increment first). Therefore, since the I/O-DMA master 110 will check whether grant# has been de-asserted at every cycle after latency timer 120 has expired, it is assured that the I/O-DMA master 110 will release the primary bus 80 immediately after grant# has been de-asserted at the expiration of shadow timer 86.

One can anticipate that, during the period when device 100 is communicating with device 300, another peripheral device connected to secondary bus 90, for example peripheral device 400, may arbitrate for secondary bus 90. However, if device 100 has not completed its data transfer and the shadow timer 86 has not expired, device 100 will not release the primary bus 80 and, consequently, PCI-PCI bridge 70 will not release the secondary bus 90. Therefore, under such conditions, device 400 may not gain access to secondary bus 90.

On the other hand, if device 400 was required to re-arbitrate after secondary bus 90 has been released, it would have caused a wasteful idle time of secondary bus 90, while arbiter 92 decides which device has priority to receive grant#. In order to substantially eliminate this idle period, in the preferred embodiment, bus arbiter 92 is permitted to de-assert the grant# from PCI-PCI bridge 70 and shift it to another requesting device, such as peripheral device 400. As explained above, PCI-PCI bridge 70 will not release the secondary bus 90 until peripheral device 100 has released the primary bus 80. However, since peripheral device 400 has grant#, it may assert frame# as soon as PCI-PCI bridge 70 releases the secondary bus 90. That is, by completing the arbitration during the time device 100 transmits data, a master device may assert frame# as soon as secondary bus 90 is released.

In the preferred embodiment, elements such as the shadow registers and the shadow timers, are incorporated into the PCI-PCI bridge chip. However, as stated above, other arrangements are possible. For example, the shadow registers and timers may be incorporated in each of the respective system busses. Such an example is shown in FIG. 4, in which elements similar to those of FIG. 3 are designated by similar reference numerals.

Figure 4:
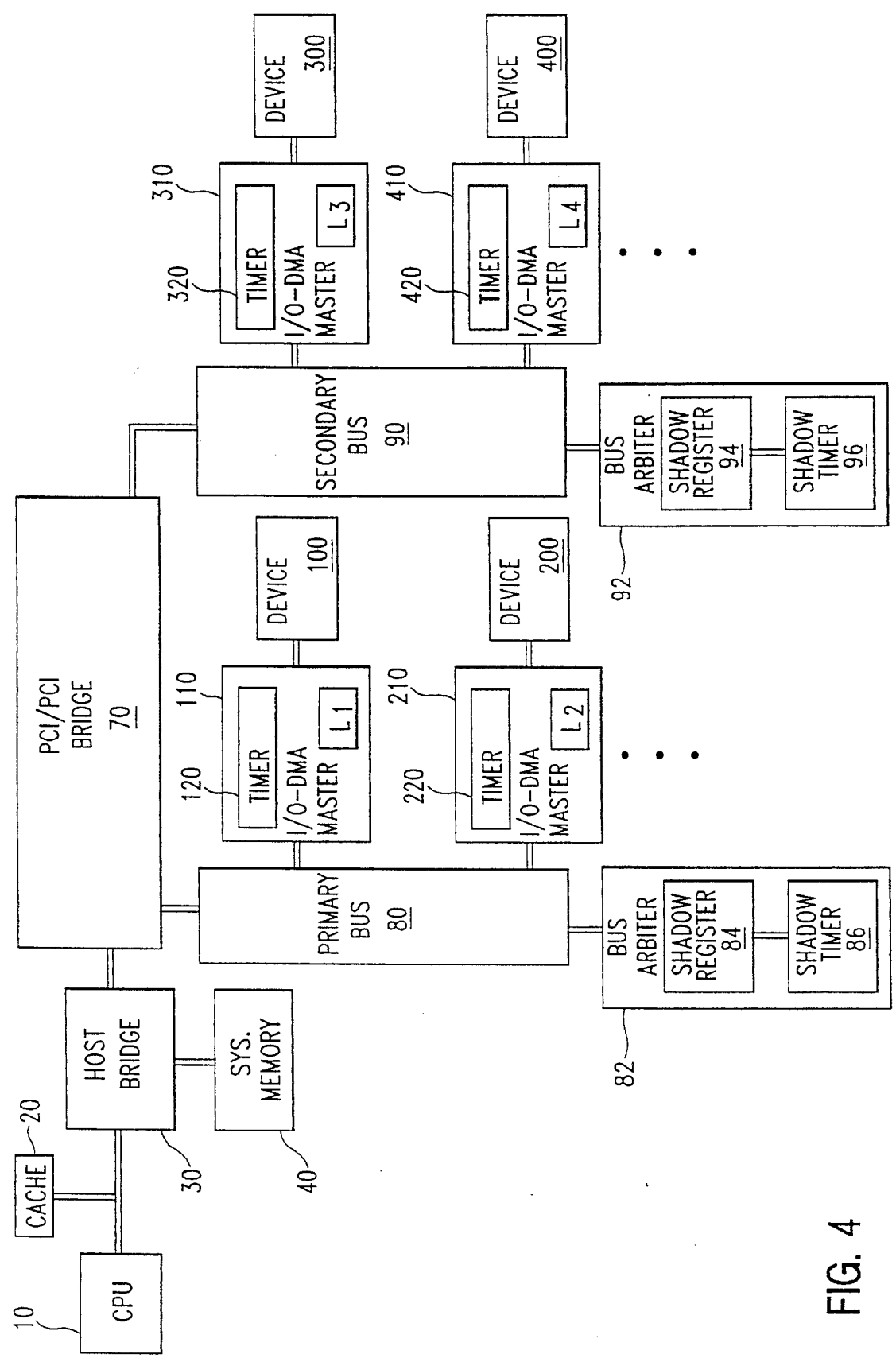
FIG. 4 is a circuit block diagram of a multiple bus PCI system according to another embodiment of the present invention.

In FIG. 4, each of bus arbiters 82 and 92 is shown to respectively include shadow registers 84 and 94 and shadow timers 86 and 96. Generally, the device of FIG. 4 operates in a similar manner as that of FIG. 3. It is noted, however, that depending on whether the transaction has been initiated from a device connected to the primary bus 80 or a device connected to the secondary bus 90, a respective shadow timer 86 or 96 will be activated. Thus, for example, in the transaction described above with reference to FIG. 3, since peripheral device 100 has initiated the transaction, its latency value $L_1$ will be registered in shadow register 84 and, upon transmission of data, shadow timer 86 will begin counting.

As mentioned above, the number of shadow timers may alternatively correspond to the number of peripheral devices. In such a case, the shadow timers may be located in the PCI-PCI bridge, in a respective bus to which the respective device is connected, or in each of the respective peripheral devices. However, it is preferable that the shadow timers be located in the PCI-PCI bridge 70.

It is noted that in the preferred embodiment, an arbiter may de-assert the grant# if a master device has asserted a REQ# without going on the bus, or if a master fails to go on the bus while having GNT# asserted for more than 16 cycles.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A computer system, comprising:

a central processing unit;

a bridge unit coupled to said central processing unit;

at least one shadow timer for counting a received time value;

first and second buses, each of which is coupled to said bridge unit;

a plurality of first peripheral units coupled to said first bus, each of said plurality of first peripheral units including an associated latency timer for counting an associated latency time value; and a plurality of second peripheral units coupled to said second bus, each of said plurality of second peripheral units also including an associated latency timer for counting an associated latency time value, the latency time value associated with each of said first and second peripheral units representing a time necessary to perform a transfer operation;

wherein each of said first peripheral units is operable for transferring and receiving information from any one of the other first peripheral units and from any one of said second peripheral units; and wherein during a transfer operation in which information from one of said first peripheral units is transferred to one of said second peripheral units, the one first peripheral unit receives control of said first bus, the latency timer associated with the one first peripheral unit begins its counting operation with its associated latency time value in response to the one first peripheral unit obtaining control of said first bus, said at least one shadow timer receives the latency time value associated with the one first peripheral unit, and said at least one shadow timer begins its counting operation with said received latency time value in response to the one first peripheral unit obtaining control of said second bus and starting the transfer of information to the one second peripheral unit.

2. The computer system as defined in claim 1, wherein each of said second peripheral units is operable for transferring and receiving information from any one of the other second peripheral units and from any one of said first peripheral units.

3. The computer system as defined in claim 1, wherein each of said first and second peripheral units includes a peripheral device and an input/output master circuit coupled to said peripheral device and to one of said first and second buses.

4. The computer system as defined in claim 1, wherein said bridge unit further includes a first bus arbiter circuit for controlling access to said first bus, and a second bus arbiter circuit for controlling access to said second bus.

5. The computer system as defined in claim 1, wherein said bridge unit further includes a register for receiving a latency time value from one of said plurality of first and second peripheral units.

6. The computer system as defined in claim 1, wherein there is a single shadow timer.

7. The computer system as defined in claim 6, wherein said single shadow timer is disposed in said bridge unit.

8. The computer system as defined in claim 1, wherein there are first and second shadow timers, said first shadow timer being coupled to said first bus, and said second shadow timer being coupled to said second bus.

9. The computer system as defined in claim 1, further comprising a first bus arbiter circuit for controlling access to said first bus, and a second bus arbiter circuit for controlling access to said second bus.

10. The computer system as defined in claim 9, further comprising first and second shadow registers coupled to said first and second bus arbiter circuits, respectively, said first shadow register operable for storing a latency time value associated with one of said plurality of first peripheral units, and said second shadow register operable for storing a latency time value associated with one of said plurality of second peripheral units.

11. The computer system as defined in claim 10, further comprising first and second shadow timers, coupled to said first and second shadow registers, respectively, said first shadow timer operable for counting the time value contained in said first shadow register, and said second shadow timer operable for counting the time value contained in said second shadow register.

12. In a computer system having a host bridge connected to a plurality of system busses, each of the system busses connected to at least one of a plurality of peripheral devices, each of the peripheral devices having a respective latency timer and a respectively assigned latency value, said plurality of system busses connected to a bus bridge for permitting communication among said peripheral devices and between any one of said peripheral devices and the host bridge, a method of controlling communication initiated by one of said peripheral devices connected to a first bus of said system busses and defined as a master device, and one of said peripheral devices connected to a second bus of said system busses and defined as a target device, comprising the steps of:

a. providing a shadow timer and a respectively assigned shadow value;

b. sending a primary grant from said first system bus to said master device;

c. starting incrementation of said respective latency timer of said initiating device upon reception of said primary grant;

d. sending an address of said target device to said bus bridge;

e. sending a secondary grant from said second bus to said bus bridge;

f. allowing transmission of data from said master device to said target device;

g. starting incrementation of said shadow timer upon beginning of data transmission from said master device;

h. prohibiting said first bus from de-asserting said primary grant unless one of: said initiating device has released said first bus, and said shadow timer has reached said shadow value.

13. The method according to claim 12, further comprising the steps of setting said shadow value to equal said respective latency value of said initiating device.

14. The method according to claim 12, further comprising the step of de-asserting said secondary grant and sending a grant to a requesting device of one of said plurality of peripheral devices.

15. A bus bridge for providing connection between a first data bus and a second data bus, said bus bridge having a shadow timer which begins to increment upon establishment of the connection between said first and second data busses, wherein said bus bridge terminates the connection when said shadow timer reaches a programmed value.

16. The bus bridge of claim 15, further comprising a shadow register for storing said programmed value.

17. The bus bridge of claim 16, further comprising a first peripheral device connected to said first data bus and a bus arbiter responsive to a communication from said first peripheral device to arbitrate for said second data bus, thereby establishing said connection.

18. A computer system comprising:

a first data bus;

a second data bus;

a plurality of peripheral devices each connected to said first and second buses, each of said plurality of peripheral devices having a latency timer and a respective latency value; and a bus bridge for providing connection between said first data bus and said second data bus, said bus bridge having a shadow timer which begins to increment upon establishment of the connection between said first and second data buses, wherein said bus bridge terminates the connection when said shadow timer reaches a programmed value.

19. The computer system as defined in claim 18, wherein said programmed value corresponds to said respective latency value of one of said peripheral devices sending data over said bus bridge.

* * * * *